United States Patent
Frey et al.

(10) Patent No.: US 7,791,065 B2
(45) Date of Patent: Sep. 7, 2010

(54) ULTRASENSITIVE OPTICAL DETECTOR HAVING A LARGE TEMPORAL RESOLUTION AND USING A WAVEGUIDE, AND METHODS FOR PRODUCING SAID DETECTOR

(75) Inventors: Laurent Frey, Fontaine (FR); Jean-Claude Villegier, Claix (FR)

(73) Assignee: Commissariat a l'Energie Atomique, Paris (FR)

( * ) Notice: Subject to any disclaimer, the term of this patent is extended or adjusted under 35 U.S.C. 154(b) by 245 days.

(21) Appl. No.: 11/915,946

(22) PCT Filed: Jun. 6, 2006

(86) PCT No.: PCT/FR2006/050525
§ 371 (c)(1), (2), (4) Date: Nov. 29, 2007

(87) PCT Pub. No.: WO2006/134290
PCT Pub. Date: Dec. 21, 2006

(65) Prior Publication Data
US 2008/0197285 A1  Aug. 21, 2008

(30) Foreign Application Priority Data
Jun. 7, 2005 (FR) .................... 05 51525

(51) Int. Cl.
*H01L 31/0256* (2006.01)
*H01L 27/18* (2006.01)
*G02B 6/26* (2006.01)

(52) U.S. Cl. .......... 257/31; 257/436; 257/438; 257/439; 250/336.2; 385/14; 385/42; 385/43; 385/45

(58) Field of Classification Search ............ 257/436, 257/439, 438, 31; 250/336.2; 385/43, 42, 385/45, 47, 14
See application file for complete search history.

(56) References Cited

U.S. PATENT DOCUMENTS
5,285,067 A  2/1994  Culbertson et al.

(Continued)

FOREIGN PATENT DOCUMENTS
FR  2 812 455  2/2002

OTHER PUBLICATIONS
U.S. Appl. No. 11/861,876, filed Sep. 26, 2007, Frey.

(Continued)

*Primary Examiner*—Long K Tran
(74) *Attorney, Agent, or Firm*—Oblon, Spivak, McClelland, Maier & Neustadt, L.L.P.

(57) ABSTRACT

An ultrasensitive optical detector with high resolution in time, using a waveguide, and a processes for manufacturing this detector. The detector is configured to detect at least one photon and includes a dielectric substrate and at least one detection element on the substrate, configured to generate an electrical signal starting from energy of the photon received, and a guide element to guide the photon, the energy of which is then absorbed by the detection element at an absorption zone which is less than 100 nm thick. The detection element is substantially straight on the substrate and is short, and the guide element includes a single mode light waveguide with strong confinement, placed on the detection element. The detector is particularly applicable to detection and localization of operating defects in a semiconducting circuit.

8 Claims, 2 Drawing Sheets

U.S. PATENT DOCUMENTS

| | | | | |
|---|---|---|---|---|
| 5,825,951 | A | * | 10/1998 | Kitamura ..................... 385/45 |
| 6,330,378 | B1 | * | 12/2001 | Forrest et al. ................. 385/14 |
| 6,812,464 | B1 | | 11/2004 | Sobolewski et al. |
| 2004/0017975 | A1 | | 1/2004 | Zheng et al. |
| 2004/0245592 | A1 | * | 12/2004 | Harmon et al. ............. 257/438 |

OTHER PUBLICATIONS

U.S. Appl. No. 11/911,667, filed Oct. 16, 2007, Frey et al.

G.N. Gol'tsman, et al., "Fabrication of Nanostructured Superconducting Single-Photon Detectors", IEEE Transactions on Applied Superconductivity, vol. 13, No. 2, Jun. 2003, pp. 192-195.

Deborah J. Jackson, et al., "High Bandwith, Improved Quantum Efficiency Detector Development for Multi-GHz Class QKD Throughput", Jet Propulsion Laboratory, California Institute of Technology, XP 002366561, Apr. 1, 2003, 13 pages.

F.S. Jelila, et al., "Time of Nucleation of Phase-Slip Centers in $YBa_2Cu_3O_7$ Superconducting Bridges", The American Physical Society, vol. 81, No. 9, Aug. 31, 1998, pp. 1933-1936.

Alexander Korneev, et al., "GHz counting rate NbN single-photon detector for IR diagnostics of VLSI CMOS circuits", Microelectronic Engineering, vol. 69, 2003, pp. 274-278.

A. Korneev, et al., "Sensitivity and gigahertz counting performance of NbN superconducting single-photon detectors", Applied Physics Letters, vol. 84, No. 26, Jun. 28, 2004, pp. 5338-5340.

P. LeCoupanec, et al., "An ultra-low dark-count and jitter, superconducting, single-photon detector for emission timing analysis of integrated circuits", Pergamon, Microelectronics Reliability 43, 2003, pp. 1621-1626.

Sharee J. McNab, et al., "Ultra-low loss photonic integrated circuit with membrane-type photonic crystal waveguides", Optics Express, vol. 11, No. 22, XP-002366563, Nov. 3, 2003, 13 pages.

R. Romestain, et al., "Fabrication of superconducting niobium nitride hot electron bolometer for single-photon counting", New Journal of Physics 6, 2004, pp. 1-15.

Y. Shani, et al., "Efficient coupling of a semiconductor laser to an optical fiber by means of a tapered waveguide on silicon", Appl. Phys. Lett., 55 (23), Dec. 4, 1989, pp. 2389-2391.

A. Verevkin, et al., "GHz-Rate Superconducting Photon Counting Detector", Department of Electrical and Computing Engineering and Laboratory of Laser Energetics, NIST Single Photon Workshop, Apr. 1, 2003, 16 pages.

J.C. Villégier, et al., "Fabrication of analog-to-digital modulators and high-speed single photon detectors in $NbN$ for Quantum Information processing", CryoPhysics Laboratory, CEA-Grenoble, 25 pages.

Feng Yang, "Photo-détecteurs supraconducteurs pour l'information quantique photonique", Rapport de Stage D'Option Scientifique, Ecole Polytechnique Promotion X2001, 14 pages.

L. Fratila, et al., "Spin-polarized quasiparticles injection in $La_{0.7}Sr_{0.3}MnO_3$ / $SrTiO_3$ / Nb heterostructure devices" Applied Physics Letters, American Institute of Physics, vol. 86, 2005, 3 pages.

"Single Photon Detector Workshop Program", NIST-National Institute of Standards and Technology, XP002370799, Mar. 31-Apr. 1, 2003, 3 pages.

G.N. Gol'tsman, et al., "Piosecond superconducting single-photon optical detector", Applied Physics Letters, American Institute of Physics, vol. 79, No. 6, Aug. 6, 2001, pp. 705-707.

G. Gol'tsman, et al., "Fabrication and Properties of an Ultrafast NbN Hot-Electron Single-Photon Detector", IEEE Transactions on Applied Superconductivity, vol. 11, No. 1, XP-002265249, Mar. 2001, 4 pages.

Seema Somani, et al., "New photon detector for device analysis: Superconducting single-photon detector based on a hot electron effect", J. Vac. Sci. Technol. B, 19 (6), American Vacuum Society, XP002366562, Nov./Dec. 2001, pp. 2766-2769.

* cited by examiner

ULTRASENSITIVE OPTICAL DETECTOR HAVING A LARGE TEMPORAL RESOLUTION AND USING A WAVEGUIDE, AND METHODS FOR PRODUCING SAID DETECTOR

TECHNICAL FIELD

This invention relates to an ultrasensitive optical detector with high resolution in time, and particularly a superconducting single photon detector SSPD, this detector using a waveguide, and processes for manufacturing such a detector.

It is applicable particularly to detection and localisation of operating defects in a semiconducting integrated circuit, by detecting the emission of specific photons by defective transistors.

It is also applicable to reception and routing circuits for very high speed telecommunications, particularly intended for telecommunication satellites, due to the very low thermal dissipation of the detector according to the invention.

The invention is also applicable to coding and detection of the quantum code key in a cryptography system.

It is also applicable to manufacturing of detector matrices for very high sensitivity imagery and single-photon or correlated photons tomography.

STATE OF PRIOR ART

Emerging techniques such as calculation and quantum cryptography, astronomy, the failure test of integrated circuits in microelectronics, medical imagery with photonic detection (SPEC, TEP, TEMP) or detection of biological objects require radiation detectors, particularly in the visible or near infrared range, that are very fast, have very low jitter, make very little noise and are extremely sensitive; they must be capable of detecting very low flows, even a single photon.

In this respect, refer to document [Verevkin 03] or document [Romestain 04] that, like the other documents mentioned below, are mentioned at the end of this description.

Potentially, SSPDs have all the qualities mentioned above and are good candidates for replacing existing avalanche photodiodes and photomultiplier tubes for which performances are limited, particularly in the infrared range.

SSPDs exist in the form of STJs (Superconducting Tunnel Junctions) and in the form of bolometers, including ultrafast bolometers, namely Hot Electron Bolometers (HEB).

HEBs use ultra-thin superconducting films less than 10 nm thick, to obtain very short characteristic times of the order of 10 ps (see [FR 2 812 455]). The preferred material for these films is niobium nitride (NbN) in the B1 cubic phase.

In these HEBs, the NbN film is epitaxied on a substrate that is typically made of sapphire and for which the orientation is $1\bar{1}02$ (R plane); and after structuring, this film forms meanders with a width varying from 100 nm to 200 nm, the film thus forming a coil in the active part of the detector (see [Villégier 04]).

For example, manufacturing, operation and characterisation of these SSPD detectors are described in [Goltsman 03] or [Korneev 03]. The detection efficiency, or the conversion efficiency of the photon into an electric signal, is a key parameter that has to be optimised and that would be equivalent to 100% for an ideal detector.

It depends on the filling ratio (overlap ratio of the incident beam and the active zone of the detector), the optical absorption in the NbN layer and the capacitance of the hot spot that is formed after absorption of the photon, to create a transient resistive barrier over the entire width of the superconducting track.

The coil structure has been designed to increase the filling ratio compared with a simple straight track of NbN deposited on a sapphire substrate and illuminated under normal incidence. In the most recent embodiments, the interval between two parallel adjacent portions of the superconducting track is as small as width of this track, and the filling ratio is equal to about 50%. It can hardly be larger than this value due to existing technological limitations associated with the electronic lithography used to form the coil structure.

A better recovery ratio can be envisaged with other techniques, but a structure with meanders that are too close together encourages cross-talk and requires a greater length of the superconducting material.

The optical absorption by NbN is of the order of 30% for a thickness of 4 nm. The only way of increasing it would be to increase the thickness of the NbN layer, but the ratio between the section of the hot spot and the section of the superconducting strip would be reduced, because the width of this track is limited to values greater than about 100 nm by the electron beam that is used to form the track. This condition would cause a strong reduction in the global efficiency (see [Korneev 03]).

Therefore, the detection efficiency cannot exceed about 15% with this architecture. It reaches 5% to 7% at wavelengths used for telecommunications in the most recent generation of detectors (see [Korneev 04]).

It would probably be difficult to do much better because of irregularities in the width of the NbN track and the long length of this track (150 μm to 200 μm when this track is spread out), that cause classical or quantum electronic fluctuations.

Several approaches have been proposed to increase coupling of light in the absorbent region of the detector.

For example, it has been proposed to use a mirror and a possible anti-reflection layer. Light that passes through the NbN without having been absorbed is then reflected on the NbN by a concave mirror (see [FR 2 812 455]) or by a plane mirror (see [Le Coupanec 03]). The NbN film may be covered by an anti-reflection layer to eliminate losses by reflection of the incident wave.

The expected detection efficiency is 40%, but in any case it is limited by the filling ratio (50%) that is inherent to any film design attacked under normal incidence.

It has also been proposed to use coupling by waveguide (see [Jackson 03]). According to this approach, light output from a single mode optical fibre is injected through a diffractive optical element in a silicon multimode plane waveguide. The NbN coil that is placed above this silicon guide absorbs the evanescent wave that propagates on the surface of the guide, and the photon that has just been detected can be absorbed by a line of meanders formed by the coil at each passage of the evanescent wave. In principle, the probability of absorption by NbN is 100% if the meanders are sufficiently numerous.

Refer also to document [Yang 04] that studies absorption of a NbN layer placed in a stack comprising a substrate and a guide layer that is formed on this substrate and is used as a waveguide. The NbN layer may be formed on this layer acting as a waveguide or between this layer and the substrate.

A light wave propagates in the stack through the guide layer.

Assuming that the guide layer is an appropriate thickness of a sapphire layer, the length of NbN necessary to absorb light is typically a few tens of micrometers (the calculations being made in one dimension for plane guides).

PRESENTATION OF THE INVENTION

This invention is intended to solve the problem of designing an ultrasensitive optical detector with high resolution in time, particularly an SSPD type detector with a very good efficiency and more specifically, of designing such detectors operating with a waveguide.

Architectures according to prior art cannot solve this problem, or at least can only partially solve it.

The feasibility of the structure comprising an NbN coil on an SOI type guide, a structure that is proposed in document [Jackson 03], is not clearly demonstrated technologically: the expitaxial growth of NbN on Si requires difficult surface treatments of Si and a study of the deposit of interface epitaxial layers.

And in the study made in document [Yang 04], neither the structure of the guide and of NbN in the plane of layers, nor the practical construction of the structure considered are envisaged; no technological solution is given including the choice of materials, the manufacturing process and methods of injecting light in the structure.

The structure proposed in this invention can significantly increase the detection efficiency compared with the best performances achieved up to now.

According to one preferred embodiment, this structure does this by using a waveguide with strong confinement superposed on a short superconducting track, this track absorbing practically all injected light.

The feasibility of the architecture of this structure is demonstrated and described in the following in terms of the choice of the materials and process conditions.

Two technological solutions are proposed to make such a structure:
  transfer by hybridising (bonding) a substrate carrying the guide on another substrate carrying a superconducting layer that is etched to form the superconducting track, or
  deposit a layer with a high refraction index on the superconducting layer and then etching the two layers.

The advantages of this structure are given below.

Firstly, the longitudinal coupling geometry can improve the detection efficiency compared with known devices, and absorb energy without specifically making use of a hot point, by generation of a PSC (Phase Slip Centre), or by generation of a Josephson vortex depending on the detection structure considered, which enables a greater width for the superconducting track and therefore can relax manufacturing constraints.

Secondly, a short superconducting track maintains more uniform temperature and critical current, which firstly also contributes to improving the efficiency, and secondly reduces noising and jitter, by reducing classical and quantum electronic fluctuations.

Thirdly, manufacturing of the structure is compatible with integrated optics technological paths that are now well controlled, which opens up the path to new applications of such ultra-sensitive and ultra-fast detectors, for example in spectrometry, interferometry or imagery.

More precisely, the purpose of this invention is an optical detector designed to detect at least one photon, this detector comprising a dielectric substrate, and at least one detection element on this substrate, designed to generate an electrical signal starting from the energy of the photon(s) received, and a guide element designed to guide this or these photon(s) the energy of which is then absorbed by the detection element at an absorption zone, this detector being characterised in that the detection element is substantially straight on the dielectric substrate and is short, in that the guide element comprises a light waveguide with strong confinement placed on the detection element, and in that the light waveguide is single mode and in that the absorption zone is thin, being less than 100 nm thick.

"Single mode" means single mode vertically and horizontally.

Note that the waveguide concerned in document [Jackson 03] is only vertically single mode; it is horizontally multimode, which means the use of a long coil forming meanders for the detection zone.

According to a first particular embodiment of the detector according to the invention, the detection element comprises a single layer of a material that is chosen from among bolometric materials and superconducting materials.

According to a second particular embodiment, the detection element comprises a superconducting multi-layer forming a tunnel junction and/or a Josephson junction.

The difference between the optical index of the light waveguide and the optical index of the substrate is preferably equal to at least 1.

Furthermore, the length of the detection element is preferably less than or equal to 100 µm.

According to one preferred embodiment of the invention, the thickness of the detection element, at the photon absorption zone, is less than 10 nm.

According to one particular embodiment of the invention, the detector also comprises an optical taper that is optically coupled to the light waveguide, and a single mode optical fibre designed to inject the photon(s) into the light waveguide through the optical taper.

Preferably, the detection element comprises a superconducting nitride phase.

Preferably, this phase is made of niobium nitride.

This invention also relates to a process for manufacturing the detector according to the invention, in which the detection element is formed on a first substrate, the light waveguide is formed in a light waveguide layer, and the light waveguide layer is transferred by hybridising onto the first substrate carrying the detection element, the steps for forming the light waveguide and transferring by hybridising being done such that the detection element is located between the substrate and the light waveguide.

According to a first particular embodiment of the process according to the invention, the step of forming the light waveguide is done before the step of transferring by hybridising.

According to a second particular embodiment, the step of forming the light waveguide is done after the step of transferring by hybridising.

This invention also relates to another process for manufacturing the detector according to the invention, in which a layer of detecting material is formed on a first substrate, a light waveguide layer with a high refraction index is formed on the layer of detecting material, and the light waveguide layer and the detecting material layer are etched using the same lithographed mask to form the light waveguide and the detection element respectively.

This invention also relates to another process for manufacturing the detector according to the invention in which a layer of detecting material is formed on a first substrate, a light waveguide layer with a high refraction index is formed on the detecting material layer, the light waveguide layer is etched to form the light waveguide, and the detecting material layer is etched using the light waveguide layer that was etched, as a mask to form the detection element.

According to a first particular embodiment common to these other processes, the light waveguide layer is deposited on the detecting material layer.

According to a second particular embodiment common to these other processes, the light waveguide layer is transferred onto the detecting material layer.

In this case, according to one particular embodiment of the invention, the light waveguide layer is formed on a second substrate, this light waveguide layer is hybridised on the detecting material layer, the second substrate is eliminated and the light waveguide layer is then etched.

BRIEF DESCRIPTION OF THE DRAWINGS

This invention will be better understood after reading the description of example embodiments given below, purely for guidance purposes and in no way limitative, with reference to the attached drawings on which.

DETAILED PRESENTATION OF PARTICULAR EMBODIMENTS

Figure 1:
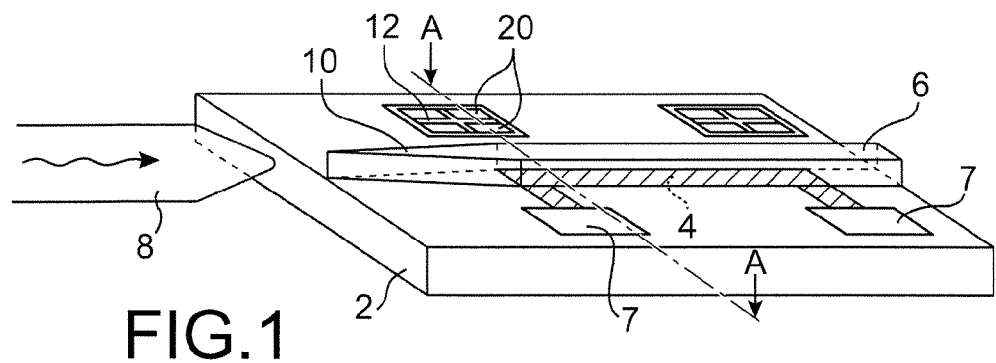
FIG. 1 is a diagrammatic perspective view of a particular embodiment of the SSPD type detector according to the invention, FIG. 2 diagrammatically shows a process for manufacturing a detector in FIG. 1, FIG. 3 diagrammatically illustrates another process for manufacturing this detector before etching of the superconducting layer.

Before describing an example of a single photon superconducting detector conforming with the invention, with reference to FIG. 1, note that this detector must be capable of operating with a very low photons flow. The probability of absorption of a photon is assumed to be proportional to the local intensity that would be obtained with a high and continuous photons flow (same maps).

The detector in FIG. 1 comprises a dielectric substrate 2, a superconducting track 4 that may for example be made of NbN and that is formed on this substrate, and a light waveguide 6 with high confinement that is formed on this track 4.

The cryostat in which the substrate is placed is not shown, nor are the detector control means, nor the processing means of electrical signals output by the detector.

However, the contacts 7 provided at the ends of the track 4 for connection of these control means and these processing means can be seen.

The light output from a single mode optical fibre 8 is injected into the waveguide 6. The strong confinement of this waveguide is the result of a large difference in the optical index, equal to at least 1, between the core of the guide and the substrate 2 or the superstrate not shown, that may cover the detector formed on the substrate 8.

Under this guide 6 there is a thin superconducting layer that has been etched along a straight line to form the track 4. The thickness of this layer is typically equal to 4 nm.

The injection of light that takes place in fibre 8 can occur with a very good coupling ratio (more than 90%) if a lens fibre is used, associated with an inverse lateral taper 10 (see documents [Shani 89], and [Mcnab 03]).

The geometry of this taper 10 may be optimised to operate with a given straight polarisation of light, or independently of the polarisation but with greater constraints on the technology.

The waveguide 6 not only has strong confinement, but is also vertically and horizontally single mode so as to increase the light energy density and therefore the probability of absorption over a short distance of the superconducting track 4.

The materials and the geometry are chosen such that the length of the track 4 is significantly less than the length of the unwound coil equal to 150 to 200 µm, so that the detection structure is genuinely better than the structure that uses a coil: the track length is chosen to be equal to or less than 100 µm.

Longitudinal coupling between the guided light wave and the superconducting fluid close to the transition generates a PSC (Phase-Slip Centre) in the case of a bridge, or a "Josephson vortex" in the case of a Josephson junction.

These mechanisms are described and observed under polarisation and operating conditions fairly similar to those in hot point detectors (see [Jelila 98]).

The generation of a PSC does not necessarily require the existence of an initial hot spot, so that a greater length is possible (300 nm to 1 µm or even more) for the superconducting track 4.

Photonic energy is absorbed over a short and defined longitudinal distance along the superconducting track, and manufacturing of this less narrow structure is made easier.

Furthermore, the voltage pulse generated by a PSC (or by a "Josephson vortex" in the case of a Josephson junction) is fairly independent of the position of the PSC on the track 4 and its amplitude and its time width are reproducible because it does not depend much on local irregularities of the superconducting track 4.

Light energy carried by the waveguide 6 into the superconducting track 4 can be detected:
  either according to the principle of hot electron bolometers with a threshold that use a polarisation in a sub-critical current (see [Korneev 04]), in this case also including the PSC mechanism,
  or by measuring the fast variation of the Josephson current (detection of a "Josephson vortex") of a superconducting junction (STJ) or a SQUID,
  or by detection of the variation in the impedance of a superconducting tunnel junction that is polarised in its quasi-particles "gap" according to the principle of SIS receptors (eliminating the Josephson current using a magnetic field).

The range of wavelengths that can be envisaged for the detector corresponds to the intersection of the absorption spectrum of the superconducting material from which the track 4 is made, and the single mode operating zone of the waveguide 6. Therefore this range is very wide and may be modulated as a function of the targeted application (in the visible range or in the ultraviolet range or the infrared range).

We will now describe processes for manufacturing a detector conforming with the invention.

The diameter of the substrates that are currently used to make SSPD detector structures (equal to 75 mm) can easily be extended to 100 mm, 200 mm or 300 mm. Therefore, it is perfectly compatible with the diameter of silicon substrates used in microelectronics industry (with the hybridising solution) and can be used for low cost production of large numbers of chips on a single substrate. Manufacturing of all possible components can also be envisaged, combining integrated optics technologies and single photon detectors (spectrometers, imaging systems, etc.).

Figure 2:
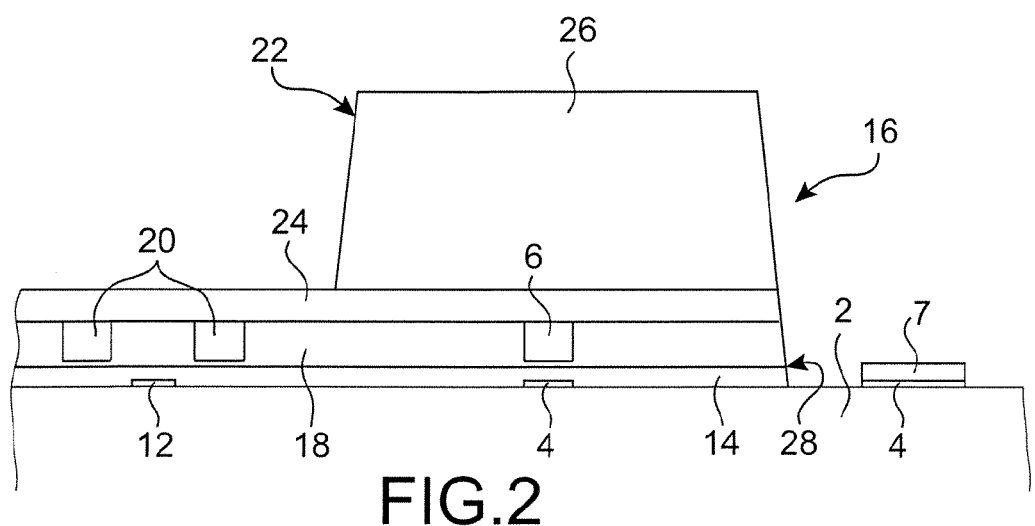

We will now describe a first process for manufacturing the detector with reference to FIG. 2, that corresponds to section AA in FIG. 1 except that the scales are not respected.

According to this first process, an SOI substrate comprising guide structures is transferred onto a sapphire or MgO substrate that is covered by structures etched in a superconducting layer. This transfer consists of collective hybridising and takes place by molecular bonding.

A number N of detectors are then manufactured simultaneously, and the SOI substrate comprises N guide structures, each comprising a light waveguide coupled to a taper while the sapphire or MgO substrate comprises N corresponding etched structures (tracks).

The steps of this first process are given below.

1. On the one hand, arrays of etched structures 4 made of NbN (thickness about 4 nm, width 300 nm to 1 µm), provided with gold or platinum contacts 7 (thickness about 15 nm), and alignment crosses 12 are made on the sapphire substrate 2. The complete assembly is then covered with a silica layer 14 that is about three times thicker (about 60 nm) than the contacts. This silica layer 14 is deposited by PECVD at about 350° C. or by sputtering. The next step is to make the assembly very uniformly plane by mechanical-chemical polishing over about 40 nm, until the contacts 7 are reached.

2. On the other hand, arrays of silicon waveguides 6 are formed, that are organised as chips in a SOI substrate 16, or a silicon on insulator substrate, and that are encapsulated in a silica layer 18 with the necessary optical connections and a good surface condition: the guides are exposed or an additional silica layer with a thickness of 5 nm to 10 nm is deposited for better bonding adhesion.

The thickness of the silicon guides 6 is less than 300 nm and their width is less than 500 nm to obtain single mode operation at 1.55 µm.

During this step, positioning patterns 20 are formed in the same silicon layer as the guides 6.

Furthermore, deep windows 22 are also hollowed out by dry or chemical etching in the SOI substrate 16, as far as the silica layer 24 in this SOI substrate, particularly at the contacts 7 and the positioning patterns 20, leaving thick silicon "beams" 26 on the back face of the SOI substrate, some beams being located above the guides 6 while other transverse beams connect the guides to each other.

The different windows are thus independent, so that the silicon layer forms a frame composed of all beams, this frame being made of a single piece and being sufficiently rigid to assure homogeneous alignment on the surface of the substrate 2.

3. The next step is bonding at an appropriate temperature (that may for example be between the ambient temperature— typically 20° C.—and 50° C.), of layer 14 to layer 18, thus forming an interface 28 between these layers, and then possibly fast annealing at a few hundred degree Celsius above this appropriate temperature, this bonding and this annealing (if any) being done after alignment of the SOI substrate 16 and the sapphire substrate 7 according to the positioning patterns in the visible range through the silica. The lateral alignment precision is then about ±0.5 µm, which is sufficient for structures with widths of this order of magnitude.

4. The next step is selective etching of silica with stopping on gold or platinum, on sapphire and on NbN, to access the electrical contacts in an appropriate manner.

5. The next step is to cut out the chips with a saw.

6. Optical and electrical connections are then set up and the detectors to be used are cooled.

If necessary depending on the detectors and their sizes, the back face of the silicon is made uniformly plane so that stresses after bonding, during the temperature excursion towards the detector operating temperature (4K), are imposed by the sapphire that is thicker (typical thickness 400 µm).

In one variant of the first process, pre-cut SOI chips are individually hybridised on a solid wafer substrate of sapphire or MgO, carrying the etched NbN structures. The result is the advantage of lower differential expansion stresses after bonding.

Note that guidance in silicon is possible because the refraction index of the silicon guide (3.5) is greater than the refraction index of the substrate, which is equal to 1.75 or 1.8 at 1.55 µm.

Furthermore, it has been demonstrated that light can be injected into an SOI guide with a very good coupling ratio (better than 90%), starting from a semi-spherical lensed fibre, using an inverted lateral taper (see [Mcnab 2003]).

99% of light injected into the guide is absorbed after 30 µm of propagation, for a 300 nm×300 nm SOI guide and a 4 nm×300 nm NbN track separated from the guide by a 20 nm $SiO_2$ thick.

Another variant of this first process consists of bonding an unstructured layer of a material with a high refraction index onto the substrate comprising the etched detector structures (obtained in step 1.), instead of the previously etched waveguide arrays: for example a very thin sheet of silicon pre-bonded on a support, or the thin layer of an SOI substrate, are used. The next step is to separate the support or to etch or plane the SOI substrate as far as the thin silicon layer.

The next step is lithography and etching of the guides that are aligned with positioning crosses on NbN. The alignment precision is of the order of ±0.5 µm, and is sufficient.

Figure 3:
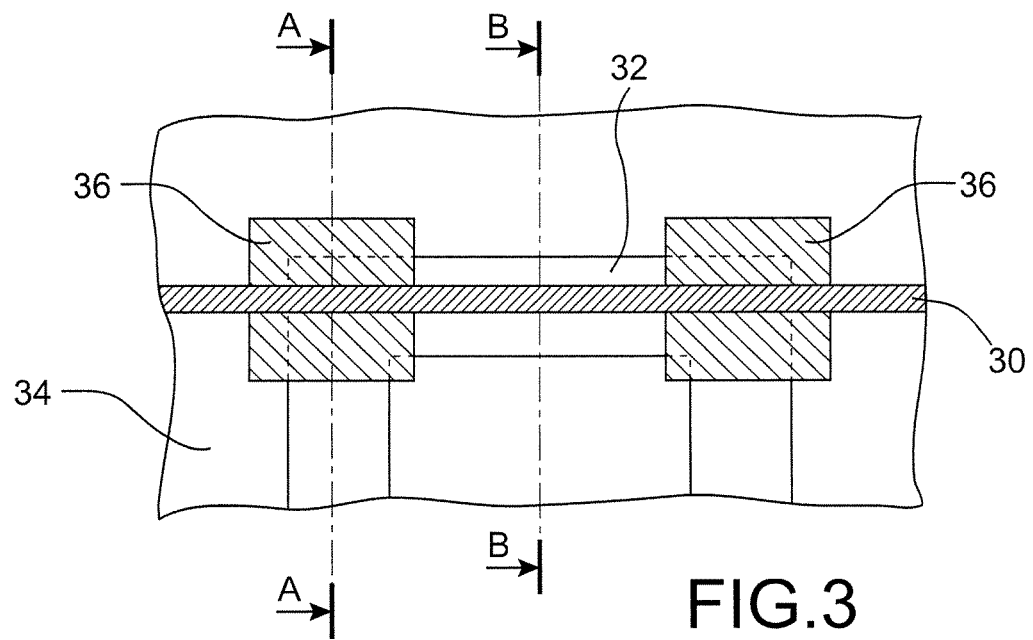

We will now describe a second self-aligned type of manufacturing process with reference to FIG. 3 that shows a diagrammatic top view of the manufactured structure before etching of the superconducting layer 32.

The first step is physical or chemical deposition of a layer 30 with a high index, for example of amorphous silicon for which the refraction index is for example 3 at 1.55 µm (this index can vary between 3 and 3.5 depending on the deposit parameters used), on a superconducting layer 32 that may for example be made of NbN and that has previously been deposited on a dielectric substrate 34. As a variant, the layer with a high refraction index can be transferred onto the detector material layer by bonding and thinning instead of being deposited.

The next step is etching of the amorphous silicon layer and the NbN layer using the same lithographed mask, to form an amorphous silicon guide and an NbN track that are superposed, in the zone provided for detection (typical section with single mode operation: 400 nm×400 nm).

This etching with the same lithographed mask avoids difficulties with alignment of the very narrow structures that are formed.

As a variant, if possible depending on the materials, the layer forming the waveguides can be etched and the etching layer obtained can be used as a mask for etching the layer of detector material (for example NbN).

At each end of the detection zone, the NbN track is formed so as to become wider and it is covered by a dielectric material 36, for example MgO, that forms a stop layer during simultaneous etching. The wider NbN zones are connected to gold contacts (not shown).

Figure 4:
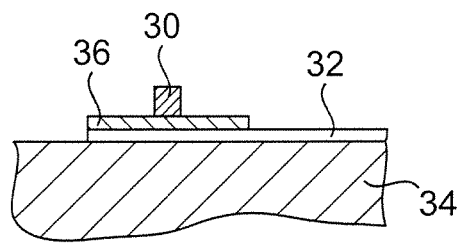
FIGS. 4 and 5 show section AA and section BB in FIG. 3 respectively after etching the superconducting layer.
Figure 5:
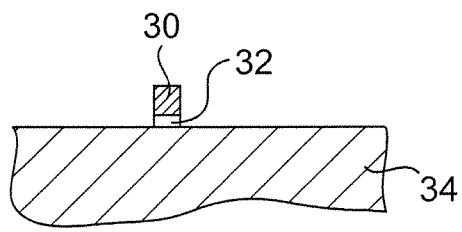

FIGS. 4 and 5 correspond to sections AA and BB respectively in FIG. 3 after etching, except that the scales are not the same.

Light can be guided in such a structure because the refraction index of amorphous silicon is greater than the refraction index of the substrate that is equal to 1.75 to 1.8 at 1.55 μm. The mode is less confined than in the case of SOI, which relaxes stresses at the injection. The absorption distance is of the order of 25 μm for an absorption at 99% for an amorphous silicon guide with section 400 nm×400 nm.

Light can be injected through a lensed fibre and an inverted taper.

Other materials can be used to form the waveguide. They are prepared in the form of layers, by deposition on NbN having a cubic structure, with the possibility of using a buffer layer, for example made of MgO, $CeO_2$ or $SrTiO_3$, to improve the texture of the deposited layers that are for example made of polycrystalline or epitaxial silicon, or $LiNbO_3$, or $BaTiO_3$, or SiC.

A detector conforming with the invention is not limited to detection of a single photon; such a detector can simultaneously detect several tens or even several hundreds of photons depending on the read electronics used.

Furthermore, in this invention, NbN thicknesses greater than those given in the examples can be used. Furthermore, superconductors other than NbN can be used, for example other phases of superconducting nitrides or phases of superconducting cuprates at high temperature. For example, we can mention MoN, TaN, TiN, VN, $MgB_2$, $YBa_2Cu_3O_{7-x}$, $ReBa_2Cu_3O_{7-x}$, Nb—Ti (N), MoGe, MoRe, NbSi and HgBaCaCuO.

More generally, as already mentioned, materials other than superconductors can be used. Any material capable of detecting low light energy and restoring an electrical signal corresponding to this energy can be used, for example a bolometric material or a semiconducting material.

This material may be in the form of a single layer or it may be used in a stack making up a tunnel and/or Josephson junction, for example the type of this stack being NbN/MgO/NbN or manganite/barrier layer/manganite, or ferromagnetic metal/barrier layer/ferromagnetic metal or metal (ferromagnetic or not)/barrier layer/superconducting layer (see [Fratila 05]).

Note that the absorption zone at which the energy of the photon(s) is absorbed by the detection element that the detector according to the invention comprises, is thin; it is less than 100 nm thick.

Advantageously, the thickness of this absorption zone is less than 50 nm; it may even be less than 10 nm, or even 5 nm.

The thinner the absorption zone, the faster the detector, which is one of the purposes of the invention. On the other hand, coupling is even more difficult. This coupling may be obtained by an appropriate choice of materials and dimensions for the optical detector as it is described above (in particular see the example of the first process that was given with reference to FIG. 2 and according to which a detector conforming with the invention is made in which the thickness of the NbN detection is about 4 nm).

Note also that the guide element that is included in a detector according to the invention guides the light wave according to the same mode at least over the length of the detection zone. Thus, the light space profile is kept during the propagation as in any waveguide.

Admittedly, document [US 2004/17975] describes an optical detector comprising a "taper" but this taper cannot be considered like a waveguide because the progressive variation of its section transforms the wave mode adiabatically during propagation (see paragraph [0035] in this document).

The documents which are mentioned in this description are as follows:

[FR 2 812 455] FR 2 812 455 A, invention by R. Sobolewski et al. (Schlumberger and Rochester University, February 2002)

[Gol'tsman 03] Gol'tsman et al., "Fabrication of Nanostructured Superconducting Single Photon Detectors", IEEE Transactions on Applied Superconductivity, 13(2), 192, June 2003

[Jackson 03] D. Jackson, J. Stern, "High bandwidth, improved quantum efficiency detector development for multi-GHz class OKD throughput", Jet Propulsion Laboratory, California Institute of Technology, Single Photon Detector Workshop, NIST, Gaithersburg, April 2003

[Jelila 98] F. S. Jelila et al., "Time of nucleation of phase-slip centers in $YBa_2Cu_3O_7$ superconducting bridges", Phys. Rev. Lett. 81, 1933 (1998)

[Korneev 03] A. Korneev et al., "GHz counting rate NbN single-photon detector for IR diagnostics of VLSI CMOS circuits", Microelectronics Engineering 69, 274 (2003)

[Korneev 04] A. Korneev et al., "Sensitivity and gigahertz counting performance of NbN superconducting single-photon detectors", Appl. Phys. Lett. 84, 5338 (2004)

[LeCoupanec 03] LeCoupanec, W. K. Lo, K. R. Wilsher, "An ultra-low dark count and jitter, superconducting, single-photon detector for emission timing analysis of integrated circuits", Microelectronics Reliability, 43 (2003), 1621

[McNab 03] S. J. McNab et al., "Ultra-low loss photonic integrated circuit with membrane-type photonic crystal waveguides", Optic Express 11 (22), 2927 (2003)

[Romestain 04] R. Romestain et al., "Fabrication of superconducting niobium nitride hot electron bolometer for single photon counting", New Journal of Physics, 6, 129, 2004

[Shani 89] Y. Shani et al., "Efficient coupling of a semiconductor laser to an optical fiber by means of a tapered waveguide on silicon", Appl. Phys. Lett. 55 (23), 2389 (1989)

[Verevkin 03] A. Verevkin et al., "GHz-Rate Superconducting Photon Counting Detector", Single Photon Detector Workshop, NIST Gaithersburg, April 2003

[Villégier 04] J. C. Villégier, "Fabrication of High-Speed Single Photon Detectors and Analog-to-Digital Modulators in NbN Technology for Quantum Information Processing", invited conference, workshop WEH 28 November-3 December, Bad Honnef, D

[Yang 04] F. Wang, "Photo-détecteurs supraconducteurs pour l'information quantique photonique", scientific option work experience report, Ecole Polytechnique, July 2004

[Fratila 05] L. Fratila et al., <<Spin-polarized quasi-particles injection in $La_{0.7}Sr_{0.3}MnO_3/SrTiO_3/Nb$ heterostructure devices>>, Applied Phys. Lett. 86, 122505 (2005)

[US 2004/17975] US 2004/0017975 A, invention by J-F. Zheng et al.

The invention claimed is:

1. An optical detector, configured to detect at least one photon, comprising:
  a dielectric substrate;
  at least one detection element on the substrate, configured to generate an electrical signal starting from energy of the at least one photon received; and
  a guide element, configured to guide the at least one photon, the energy of which is then absorbed by the at least one detection element at an absorption zone,
  wherein the at least one detection element is substantially straight on the dielectric substrate and is less than or equal to 100 μm, the guide element comprises a light waveguide with strong confinement, placed on the at least one detection element, the light waveguide is single mode, and the absorption zone is less than 100 nm thick.

2. A detector according to claim 1, in which the at least one detection element comprises a single layer of a material that is chosen from among bolometric materials and superconducting materials.

3. A detector according to claim 1, in which the at least one detection element comprises a superconducting multi-layer forming a tunnel junction and/or a Josephson junction.

4. A detector to claim 1, in which the difference between the optical index of the light waveguide and the optical index of the substrate is equal to at least 1.

5. A detector according to claim 1, in which the thickness of the at least one detection element at the photon absorption zone is less than 10 nm.

6. A detector according to claim 1, further comprising an optical taper that is optically coupled to the light waveguide, and a single mode optical fiber, configured to inject the at least one photon into the light waveguide through the optical taper.

7. A detector according to claim 1, in which the at least one detection element comprises a superconducting nitride phase.

8. A detector according to claim 7, in which the nitride phase is made of niobium nitride.

* * * * *